April 17, 1934.   A. F. HANNEY   1,955,382
MOTOR CONTROLLING DEVICE
Filed Aug. 31, 1932   2 Sheets-Sheet 1
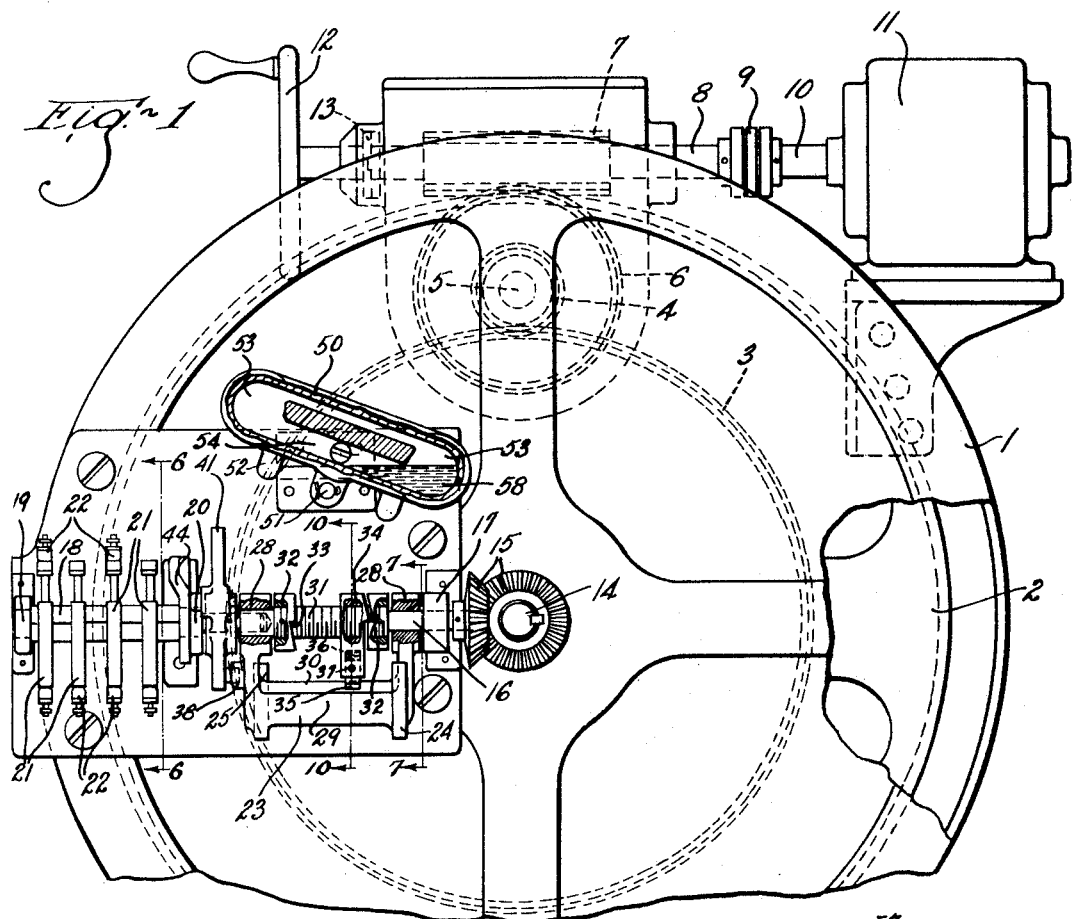
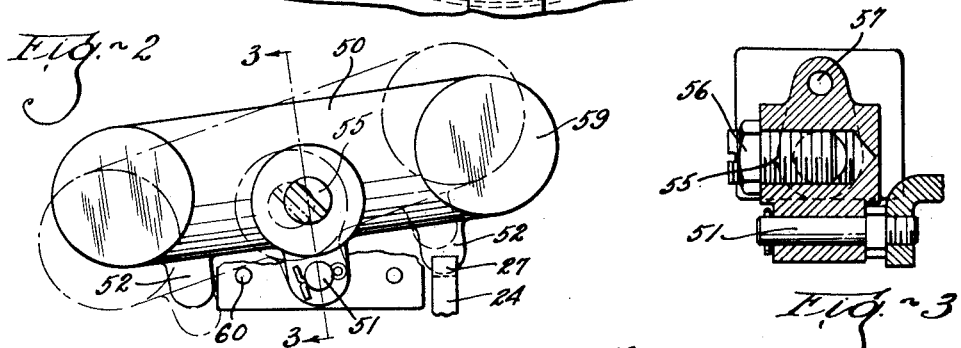
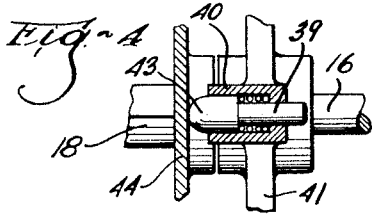
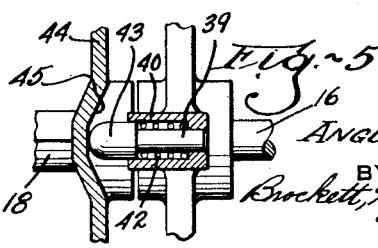
INVENTOR
ANGUS F. HANNEY
BY
Brockett, Hyde, Higley & Meyer
ATTORNEYS

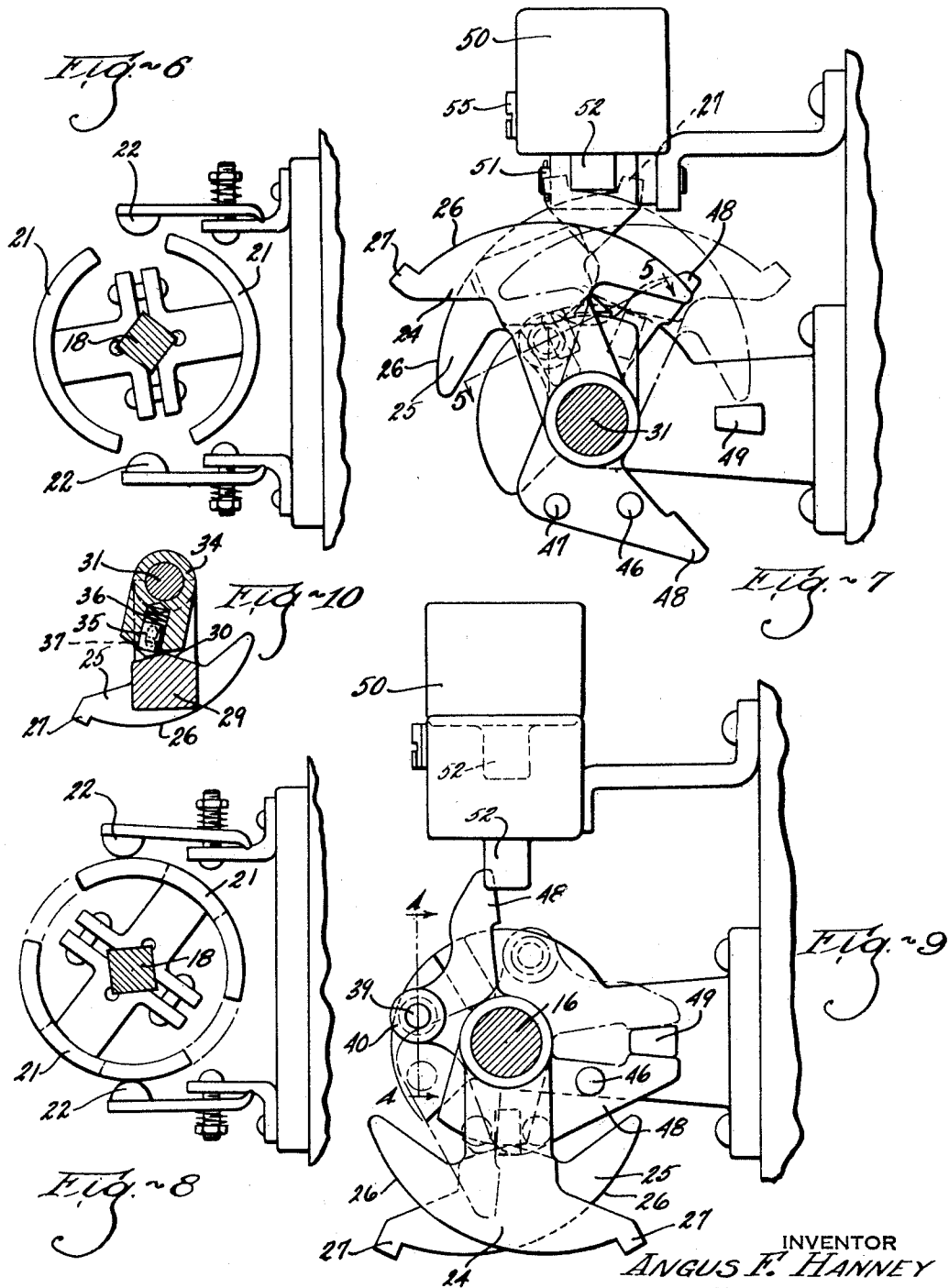

Patented Apr. 17, 1934

1,955,382

UNITED STATES PATENT OFFICE 1,955,382

MOTOR CONTROLLING DEVICE

Angus F. Hanney, Norwood, Ohio, assignor to The American Laundry Machinery Company, Norwood, Ohio, a corporation of Ohio Application August 31, 1932, Serial No. 631,246

12 Claims. (Cl. 172—240)

This invention relates to motor controlling devices, and particularly to mechanism for reversing the direction of rotation of electric motors for driving reversible parts to be driven. The invention is particularly useful in connection with devices driven by motors which are reversed by throwing them directly across the line in the opposite direction, such as electric motors for driving the rotatable drums of washing machines, drying tumblers or like machines of relatively small capacity.

One object of the invention is to provide motor reversing mechanism of the character described, in which the reversing is accomplished by improved mechanism arranged to open the circuit which rotates the motor in one direction and to then delay closing of the circuit in the opposite direction to provide an interval during which the speed of the part to be driven may be reduced, to thereby avoid shock, jar and wear on the mechanism.

A further object of the invention is to provide improved mechanism of this character in which the switch mechanism is first opened, then latched in open position, and then closed in the opposite direction, with the parts latched for a period which not only provides for deceleration of the motor and driven parts, but which also is capable of adjustment by the operator to meet any desirable conditions.

A further object of the invention is to provide mechanism of this character which may be mechanically operated directly from the part to be driven, or a part associated therewith, and which therefore avoids any necessity of using pilot motors or other separate drives for the reversing devices.

Further objects of the invention are in part obvious and in part will appear more in detail hereinafter.

In the drawings, which represent one suitable embodiment of the invention, Fig. 1 is an end elevation of the machine, partly broken out and in section to expose interior parts; Fig. 2 is an enlarged end view of the counterweight latching member; Fig. 3 is a sectional elevation thereof on approximately the line 3—3, Fig. 2, looking in the direction of the arrows; Fig. 4 is a detail cross sectional view on approximately the line 4—4, Fig. 9, looking in the direction of the arrows; Fig. 5 is a similar section on approximately the line 5—5, Fig. 7; Fig. 6 is a detail sectional view, on a larger scale, on approximately the line 6—6, Fig. 1, looking in the direction of the arrows, and showing the switch parts in latched and open position; Fig. 7 is a detail sectional view, on a larger scale, on approximately the line 7—7, Fig. 1, looking in the direction of the arrows, and showing the parts in latched position; Fig. 8 is a view corresponding to Fig. 6, and showing the parts in unlatched or switch closed position; and Fig. 9 is a detail sectional view, corresponding to Fig. 7, and showing the parts in unlatched or switch closed position; and Fig. 10 is a detail sectional view on approximately the line 10—10, Fig. 1.

It will be understood that the invention may be applied for use in the reversal of any reversible motor, of relatively low capacity, which drives a part whose motion is to be reversed and where said part mechanically actuates the reversing mechanism. It may be used, for example, to operate the rotatable drums of drying tumblers, washing machines, or the like, but is not so limited. For convenience, and in no sense of limitation, the invention is shown applied to a washing machine including a stationary outer casing or tub 1 in which rotates the usual cylinder or drum 2 having end trunnions or shafts which extend out through the end frames. One of said shafts, the one at the far end of the machine in Fig. 1 and not shown, is provided with driving mechanism for the drum, comprising a large gear 3 driven by a pinion 4 on a shaft 5 provided with a worm wheel 6 driven by a worm 7 on a shaft 8 connected by a flexible coupling 9 to the shaft 10 of the operating reversible electric motor 11, which may be of any type capable of being reversed by a simple manipulation of its circuit, such as by throwing its leads across the line in the opposite direction through switch mechanism for the purpose. 12 indicates a hand wheel normally disconnected from shaft 8 but capable at will of connection thereto through the friction clutch mechanism 13, for the purpose of manually rotating the drum to bring its door into registration with the casing door, for loading or unloading, as will be readily understood.

Reversal of rotation of motor 11 is accomplished by mechanism now to be described and which is driven by the drum shaft 14 at the near end of the drum in Fig. 1, which shaft is provided with bevel gear connections 15 to a shaft 16 rotatable at one end in a stationary bearing 17 and at its opposite end sleeved upon the reduced end of an oscillatable switch shaft 18 mounted to turn in bearings 19, 20. Said switch shaft carries a suitable number of curved segments 21 which cooperate with yielding stationary contactors 22, the segments and contactors forming the switch mechanism which reverses the motor by proper change of its circuit connections, all of which will be readily understood.

On the shaft 16 is rotatably mounted a cam member 23, of generally U-form when viewed as in Fig. 1, and which comprises two end members 24, 25, which are alike except that one is right-handed and the other left-handed, as shown in Fig. 9, and each of which includes a long curved cam portion with a cam surface 26 terminating at one end in a latching projection 27. Each of the end members has a perforated ear portion 28 mounted to rotate loosely on the shaft 16, and the two end members are connected by an intermediate body portion 29 having its upper surface bevelled off in both directions to provide an inverted V-shaped crest or ridge 30. Between the end members of the cam device the shaft 16 is provided with a screw threaded portion 31 on the ends of which, adjacent to the perforated ears 28, are pinned collars 32 each having a ratchet tooth or teeth 33 presented inwardly and cooperating with corresponding teeth on opposite faces of a traveler or trip device 34 which, in the position shown in Fig. 1, has a hollow depending portion in the cavity of which is a pin 35 pressed outwardly by a compression spring 36 and confined against escape by the set screw 37. The lower end of this pin is bevelled off on its opposite faces to correspond with the bevelling of the ridge of the body 29, and the arrangement is such that the pin 35 normally projects down to a position somewhat as shown in Fig. 1 where it will contact with the body 29 as the shaft 16 is rotated and will either carry the cam device with it around shaft 16 or, if the cam device is latched or held against movement, the pin 35 will pass over it by pin retraction permitted by compression of the spring 36.

One of the end members of the cam device is provided with a lug 38, which cooperates with one end of a spring pressed pin 39 carried in a boss 40 of an operator 41 pinned or otherwise secured to rotate with the oscillatable switch shaft 18. Pin 39 is yieldingly pressed toward the ratchet in Figs. 4 and 5 by a compression spring 42 and its opposite rounded enlarged end 43 travels along a straight wall of a stationary controlling member 44 having a recess 45 into and out of which the pin 43 is moved in a manner and for a purpose which will later appear.

The lug 38 also cooperates with one or the other of two rigid pins 46, 47, also carried by the operator 41. Said operator is provided with oppositely disposed arms 48, the terminal portions of which are presented toward each other and cooperate with a stationary lug 49 on the frame and lying between said arms.

Above the shaft 16 is located a counterweight latch member, illustrated in Fig. 2, and comprising a hollow body portion 50 pivoted at 51 on a stationary support and provided with two depending lugs 52, one on each side of the pivot. The cavity within said latching member is divided into two end chambers 53 connected by a lower channel 54 capable of being more or less restricted by screwing into or out of it a crosswise extending screw 55, which is illustrated in Fig. 3 as held in any adjusted position by a lock nut 56. The two end chambers are also connected by an upper free and open but small channel 57 for the flow of air and in said chambers is a quantity of suitable heavy operating liquid, such as the mercury mass 58. The end portions of member 50 may be suitably weighted, such as by the weight portions 59.

The mechanism described operates as follows:—

Let us assume the parts in the position shown in Fig. 1 with the electric motor rotating in such direction that the drum 3 turns in the counter-clockwise direction, Fig. 1, and that the traveler or tripper 34 is travelling to the right. It has just reached the point where the teeth of the right hand collar 32 engage the tooth of the traveler. The traveler turns freely on the threads of the shaft so that normally it hangs down and travels endwise, but does not rotate with the shaft, and the cam device 29 also hangs down and does not turn with the shaft, except when caused to turn, as will appear. As soon as the teeth of the traveler and right hand collar engage, as shown, the traveler turns with the shaft, making substantially 360° of rotation until the yielding pin at its bottom again strikes the V-shaped ridge at the top of the body of the cam device. It is easier to turn the cam device with the shaft than for the traveler to pass over it, so that the cam device now moves with the traveler, moving toward us in Fig. 1, and rising to a point where the curved cam face 26 on the right hand end member 24 engages the right hand depending lug 52 and tilts the counter-weight latch counterclockwise in Fig. 1 to approximately the position shown in full lines, Fig. 2, in which position the terminal lug 27 at the end of the cam has engaged the lug 52.

During the same motion the lug 38 has engaged the reduced end of the pin 39, lying in the position shown in Fig. 4, and has turned with it the operator 41, moving said operator and the parts carried thereby to the position shown in Figs. 5, 6 and 7. In this position the segments of the switch have been moved from contacting to open position, the rounded end 43 of the pin has entered the recess 45 and the reduced end of said pin has been withdrawn from contact with the lug 38 and the parts are in latched position. The motor circuit is therefore cut off and the drum and its connected parts continue to rotate by the coasting effect, but with the speed reducing. The cam device 29 is held from rotation by engagement of the lugs 27, 52 and shaft 16 and the traveler 34 continues to rotate through one or more revolutions, as a unit, the pin 35 receding and snapping past the V-shaped ridge at the top of the body 29 at each turn. During this operation, and while the drum is gradually reducing its speed, the mercury in the right hand chamber 58 of the counterweight latch is flowing from right to left in Fig. 2, but through the more or less restricted lower channel 54, the rate of flow depending upon the adjustment of the screw 55. Finally, all or enough of the mercury travels to the left hand chamber to cause the counter-weight to swing further in the same direction to the position shown in dot and dash lines, Fig. 2, raising the lug 52 fully above the lug 27 and releasing the cam device 23 for further movement in the same direction as before. Said cam device either immediately begins to move by the gravity effect or is picked up by the pin 35 of the traveler when the traveler next comes around so that the cam device ultimately is advanced to a position where its lug 38 engages the rigid pin 46 of the operator 41 and moves said operator to the position shown in dot and dash lines, Fig. 9, with its upper arm 48 in contact with the stationary lug 49. This final motion of the operator turns the switch shaft 18 to the position shown in dot and dash lines, Fig. 8, or to the opposite switch closed position, with a closing of the circuits to the motor in the reverse direction, so as to cause the motor to rotate reversely. This completes the first half of the cycle of operations and rotation of the motor and parts driven thereby continues with motion of the traveler or tripper along the threaded portion 31 of shaft 16 until said traveler engages the collar at the other end of the threaded portion of said shaft, when reverse operations occur, as will now appear.

When the opposite collar 32 is engaged, the traveler is again caused to turn with shaft 16 and engages the cam device 23 and turns it in the counterclockwise direction, Fig. 9, whereupon the other cam member 24 raises the left hand end of the counterweight 50, while the lug 38 again engages pin 39 and turns the switch shaft to the circuit open position, the parts being again latched by engagement of the lug 27 with the lug 52. The parts are again held in this latched position pending flow of the mercury to the right hand end of the counterweight 50, when said counterweight will fully swing over to its final position, unlatching lugs 52 and 27 and permitting further motion of the cam device 23, which engages the opposite stationary pin 47 and turns the operator back to its initial position, with closure of the switch devices in the reverse direction, completing the entire cycle of operations.

Motion of the counterweight 50 in either direction is limited by one or the other of stationary pins 60, which engage a portion of the counterweight device, as shown in Fig. 1.

With this arrangement, reversal is accomplished by parts actuated directly by the part to be driven, with a periodic opening of the motor circuits followed by a delay pending closing of said circuits in the opposite direction, and the delay is for a period which is under convenient control by the operator through adjustment of the screw 55. As a result, the parts may be so adjusted that the drum may come nearly to rest before its direction of rotation is reversed, with the avoidance of shock, jar or wear on any of the mechanism.

Other advantages will be readily apparent to those skilled in the art.

What I claim is:

1. Reversing mechanism, comprising a driven part, a reversible driving motor therefor, an oscillating reversing switch shaft for said motor having two switch-closed and an intermediate switch-open position, operating means therefor, comprising means rotating with the driven part, a reciprocating traveler movable by said means in one direction or the other in accordance with the direction of rotation of the driven part, a cam device actuated thereby, an operator for said switch shaft actuated by said cam device, and a latching member for said operator adapted to hold said switch shaft in switch-open position for a predetermined period.

2. Reversing mechanism, comprising a driven part, a reversible driving motor therefor, an oscillating reversing switch shaft for said motor having two switch-closed and an intermediate switch-open position, operating means therefor, comprising means rotating with the driven part, a reciprocating traveler movable by said means in one direction or the other in accordance with the direction of rotation of the driven part, a cam device actuated thereby, an operator for said switch shaft actuated by said cam device, and a latching member for said operator adapted to hold said switch shaft in switch-open position for a predetermined period and arranged for operation by said traveler.

3. Reversing mechanism, comprising a driven part, a reversible driving motor therefor, an oscillating reversing switch shaft for said motor having two switch-closed and an intermediate switch-open position, operating means therefor, comprising means rotating with the driven part, a reciprocating traveler movable by said means in one direction or the other in accordance with the direction of rotation of the driven part, a cam device actuated thereby, an operator for said switch shaft actuated by said cam device, and a latching member for said operator adapted to hold said switch shaft in switch-open position for a predetermined period, said latching member being arranged for self operation and being pre-set by said cam device.

4. Reversing mechanism, comprising a driven part, a reversible driving motor therefor, an oscillating reversing switch shaft for said motor having two switch-closed and an intermediate switch-open position, operating means therefor, comprising means rotating with the driven part, a reciprocating traveler movable by said means in one direction or the other in accordance with the direction of rotation of the driven part, a cam device actuated thereby, an operator for said switch shaft actuated by said cam device, a latching member for said operator adapted to hold said switch shaft in switch-open position for a predetermined period, said latching member being arranged for self operation and being preset by said cam device, and adjusting means for said latching member adapted to vary the predetermined period.

5. Reversing mechanism, comprising a driven part, a reversible driving motor therefor, an oscillating reversing switch shaft for said motor having two switch-closed and an intermediate switch-open position, operating means therefor, comprising means rotating with the driven part, a reciprocating traveler movable by said means in one direction or the other in accordance with the direction of rotation of the driven part, a cam device actuated thereby, an operator for said switch shaft actuated by said cam device, and a latching member for said operator adapted to hold said switch shaft in switch-open position for a predetermined period, said latching member comprising a pivoted multiple chambered member containing a liquid and a restricted passage by which said liquid flows from chamber to chamber.

6. Reversing mechanism, comprising a driven part, a reversible driving motor therefor, an oscillating reversing switch shaft for said motor having two switch-closed and an intermediate switch-open position, operating means therefor, comprising means rotating with the driven part, a reciprocating traveler movable by said means in one direction or the other in accordance with the direction of rotation of the driven part, a cam device actuated thereby, an operator for said switch shaft actuated by said cam device, a latching member for said operator adapted to hold said switch shaft in switch-open position for a predetermined period, said latching member comprising a pivoted multiple chambered member containing a liquid and a restricted passage by which said liquid flows from chamber to chamber, and adjusting means for varying the restriction of said passage.

7. Reversing mechanism, comprising a driven part, a reversible driving motor therefor, an oscillating reversing switch shaft for said motor having two switch-closed and an intermediate switch-open position, operating means therefor, a reversible screw shaft carrying a traveler and turning with the driven part, a cam device loosely mounted to turn around the screw shaft axis and adapted for operation by said traveler, an operator for said switch shaft actuated by said cam device, and a latch for temporarily holding said switch shaft in switch open position, said latch being set by said cam device.

8. Reversing mechanism, comprising a driven part, a reversible driving motor therefor, an oscillating reversing switch shaft for said motor having two switch-closed and an intermediate switch-open position, operating means therefor, a reversible screw shaft carrying a traveler and turning with the driven part, a cam device loosely mounted to turn around the screw shaft axis and adapted for operation by said traveler, an operator for said switch shaft actuated by said cam device, and a latch for temporarily holding said switch shaft in switch open position, said latch being set by said cam device and including self operating means for releasing the switch shaft after a predetermined period.

9. In combination with a motor and means to be reversibly driven thereby, periodic reversing means for said motor and including a reversing switch having a neutral position between forward and reverse operating positions, means associating said driven means and said switch for shifting the latter from an operating position into neutral position dependent upon driven operation of said driven means, and time-responsive means for shifting said switch from neutral position into the other operating position after a predetermined interval following attainment of said neutral position.

10. In combination with a motor and means to be reversibly driven thereby, periodic reversing means for said motor and including a reversing switch having a neutral position between forward and reverse operating positions, means associating said driven means and said switch for shifting the latter from an operating position into neutral position dependent upon driven operation of said driven means, time-responsive means for shifting said switch from neutral position into the other operating position after a predetermined interval following attainment of said neutral position, and means for adjusting said time-responsive means to vary said interval.

11. In combination with a motor and means to be reversibly driven thereby, periodic reversing means for said motor and including a reversing switch having a neutral position between forward and reverse operating positions, means associating said driven means and said switch for shifting the latter from an operating position into neutral position dependent upon driven operation of said driven means, and time-responsive means for shifting said switch from neutral position into the other operating position after a predetermined interval following attainment of said neutral position, said time-responsive means being so adjusted that said interval substantially corresponds with the coasting period of said driven means.

12. In combination with a motor and means to be reversibly driven thereby, periodic reversing means for said motor and including a reversing switch having a neutral position between forward and reverse operating positions, means associating said driven means and said switch for shifting the latter from one of said operating positions into neutral position dependent upon driven operation of said driven means, means for latching said switch in neutral position, time-responsive means for releasing said switch after a predetermined interval following its latching, and means associated with said driven means for causing said switch to move to its other operating position upon release by said latch means.

ANGUS F. HANNEY.